Patented Oct. 24, 1944

2,360,913

UNITED STATES PATENT OFFICE 2,360,913

AMINO DERIVATIVE OF ORGANIC ACIDS FOR RUBBER COMPOUNDING SURFACE ACTIVATION, ETC.

Edward A. Van Valkenburgh, New York, N. Y., assignor of three-fourths to Amino Products Corporation, a corporation of New York No Drawing. Application February 16, 1940, Serial No. 319,257

17 Claims. (Cl. 260—97.5)

This invention relates to industrial dispersing, wetting, surface-treating and rubber cure-activation compositions. It includes new composite amino-carboxylic acid products, new detergents, dispersing agents and stabilizers for emulsions and other dispersions, new cure-activators for rubber compounding, and other products as will hereinafter appear.

One of the important features of the invention is the provision of new latex foam stabilizers or dispersing agents, which are remarkably effective in enabling the production of stable foam from liquid latex compositions (for the production of the product generally known as "foam rubber") and which, besides having important advantages for stabilizing the foam, serve as effective cure-activators in the vulcanization of the product.

Another important feature of the invention is the provision of improved cure-activators for rubber, which may, at the same time, serve as dispersing agents, e. g., for improving or simplifying the dispersing of solid materials, e. g., zinc oxide or sulfur, in the rubber mix.

Another important feature of the invention is the provision of new composite amino-carboxylic acid products, which contain one or more amino bodies in kinetic equilibrium with one or more carboxylic acids, in the presence of an appreciable amount of one or more amino neutralization products, and also contain one or more compatible non-acid constituents, which may or may not be amino-reactive, which composite products, because of their content of free amine and free carboxylic acid and non-acid constituents are more effective for such purposes as dispersion or emulsification of various materials, cure-activation of rubber, surface-treatment of powdered materials, textile penetration, etc., than the simple salts of amines with carboxylic acids, e. g., ammonium stearate.

In accordance with the present invention, these composite amino-carboxylic acid products are produced by thorough admixture of a suitable amine or mixture of amines, advantageously a mixture of amines such as the by-product mother liquor from the synthesis of urea, containing urea, ammonia, ammonium carbamate, water, etc., with one or more carboxylic acids, advantageously a cheap, by-product admixture of fatty acids such as is produced in wool-degreasing, in the production of perfumes, the steel rolling mill fatty acid waste, tall oil, naval store by-products, cottonseed foots, oxidized petroleum, crude naphthenic acids, crude undecylenic acid, crude sebacic acid, or other cheap carboxylic acid mixtures which may, and advantageously do, contain organic compounds other than carboxylic acids which may or may not be reactive with amines.

In forming the composite products, the amine or amine mixture may be added to the carboxylic acid mixture, or the carboxylic acids may be added to the amino reagent, advantageously by slowly adding one constituent to the other, with efficient stirring, and with continuance of the stirring for a relatively long period of time, such as one or two days. If ammonia or other highly volatile amine, or a mixture containing such a volatile product be used, it is usually best to carry out the reaction in a pressure vessel, although this is not essential. The reaction temperature is maintained low, e. g., normal room temperatures are used, and the final product contains the reactants in kinetic equilibrium, the final system including substantial amounts of free carboxylic acid and free amine as well as the amine-carboxylic acid reaction products, and as such is quite different in character from the ordinary salts of carboxylic acids and amines produced under more vigorous reaction conditions and containing little free acid or free amine. The composite product so produced has important advantages for the various purposes referred to above over the previously known simple carboxylic acid-amine salts, because its content of unreacted acids and compatible non-acid constituents radically improves the stabilizing, dispersing, surface-treating and cure-activating properties.

In some cases, particularly with the use of relatively strongly basic amino bodies such as ammonia or the by-product urea mother liquor, an appreciable heat of reaction may develop; and in such cases, it is usually advantageous to cool the reaction vessel, to prevent volatilization of highly volatile constituents and to control the speed of the reaction and the extent to which it proceeds. Control of the extent of the reaction is sometimes important to insure the production of a reaction mixture which contains, in kinetic equilibrium, substantial amounts of free carboxylic acid and of free amino reagents, in addition to the reaction product of the carboxylic acid and the amino reagent. At elevated temperatures the reaction tends to go somewhat further toward completion than under the mild conditions, e. g., room temperature, which usually are advantageously used for producing the composite homogeneous product which constitutes one embodiment of the present invention.

In general, the composite amino-carboxylic acid products, because of the incomplete nature of the reaction by which they are produced, have what may be termed amphoteric properties, that is, they contain both free acid and free amine, and when used with relatively strongly acid or relatively strongly basic media, exert the buffering action characteristic of amphoteric materials. The incompleteness of the reaction between the carboxylic acid mixtures and the amino bodies is further shown by the fact that a partially oxidized petroleum product resulting from the controlled oxidation in the liquid phase of a 45° Bé. Pennsylvania petroleum distillate having an acid number of 159 and a saponification number of 222, when reacted by stirring for four hours with an approximately chemically equivalent amount of the above-described ammoniacal aqueous urea solution and with an amount of the same solution corresponding to about 50% excess over the equivalent amount, yielded a product having an acid number of 114 and 109 respectively, showing that while with the use of a large excess of the ammoniacal aqueous urea solution the amount of free carboxylic acid is reduced, nevertheless a very considerable amount of free acid remains in the reaction product.

Thus, there are always present in the new composite amino-carboxylic acid products of the invention both free acids and free bases, the relative respective amounts of which vary in kinetic equilibrium, depending upon the relative acid strength of the carboxylic acids originally present, upon the basicity of the amino reagents used, upon the conditions of amino treatment, upon the kind and extent of subsequent dilution, and upon the conditions of storage (such as temperature, for example).

The term "amino-carboxylic acid product" as used herein designates the product resulting from the reaction of a carboxylic acid with an amine, as distinguished from amino acids such as glycine.

Many of the carboxylic acid-containing products used as starting material in accordance with the invention contain not only carboxylic acids and non-acid materials, but also esters of carboxylic acids with various alcohols, e. g., glycerin, or contain lactones or the like; and it is advantageous where such materials are used to add an amount of amine reagent in excess of that equivalent to the free carboxylic acid and the carboxylic acid combined as esters or dehydrated as lactones. Expressed differently, it is usually advantageous to add an excess of amino reagent over that corresponding to the saponification number of the acid-containing constituents, instead of merely adding an amount corresponding to the acid number, or a slight excess thereover. Substantially better results in the cure-activation of rubber, for example, are obtained with the use of the larger quantity of amine reagent where the acid-containing constituents contain such materials as esters or lactones. Even where such excess is used, the resulting product, produced by reaction at low temperatures or ordinary temperatures, will contain free carboxylic acid as well as free amine.

The amino product produced should be homogeneous, and should not separate into layers or fractions even when subjected to marked changes in temperature. Most of the amino reaction products are of this nature, but in some cases it is advantageous to add compatible homogenizing agents or solvents, such as acetone, di-ethylene glycol, isopropyl alcohol, water, crude solvent naphtha, or the like to assist in maintaining a homogeneous condition, or for other purposes.

Some of the amino reaction products, particularly those made with ammonia or aliphatic amines are somewhat difficultly soluble or emulsifiable in non-aqueous media, and incorporation of such agents in non-aqueous media may be improved by replacement of some of the amine with an aromatic amine such as aniline or the like.

In general, the new composite products, and particularly those containing substantial amounts of non-acid constituents, such as esters, alcohols, etc., show a remarkably high degree of compatibility with various diluent materials, such as water and organic solvents, forming with such materials homogeneous and quite stable colloidal dispersions. Some of the amino reaction products are more compatible with water, and with larger quantities of water, than others; and in general, the reaction products which are most compatible with water are least compatible with organic solvents. The converse is also true, that is, some of the amino reaction products are more compatible with organic solvents, or form stable, homogeneous dispersions with larger quantities of organic solvents, than others; and in general, those compounds which are most compatible with organic solvents are least compatible with water. However, even the products which form homogeneous, stable dispersions with practically any quantity of water are compatible with relatively large quantities of organic solvent, and those which form stable, homogeneous dispersions with almost any quantity of organic solvent are compatible with relatively large quantities of water.

For example, the compatibility with water was studied for certain of the amino-carboxylic acid products of the invention, which, as already explained, may have both hydrophilic and hydrophobic properties.

As a specific illustration, a comparative study as to water compatibility was made for two products obtained by treating a petroleum oxidation reaction mixture with different amounts of the above described ammoniacal-urea mother liquor and of aniline respectively.

The petroleum oxidation reaction mixture used in the preparation of these two amino products was obtained by the controlled oxidation in the liquid phase of 45° Bé. distillate from Pennsylvania petroleum, until the resulting oxidation reaction mixture had approximately an acid number of 159 and a saponification number of 222.

The two amino products were prepared by successively adding with mechanical agitation to 100 parts by weight of the petroleum oxidation reaction mixture the following amounts of urea mother liquor and of aniline:

|  | Urea-aniline product #1 | Urea-aniline product #2 |
|---|---|---|
| Urea mother liquor | 26.4 | 33.9 |
| Aniline | 20 | 37.7 |

In each case the urea mother liquor was first gradually added with mechanical agitation, and the stirring was continued for four hours. At the end of this interval the aniline then was gradually added and the stirring was continued for another four hour interval.

To study its compatibility with water, to 146.4 parts by weight of "Urea-aniline products #1," there were respectively incorporated the following amounts of distilled water, the mixing in each of the nine cases having been carried out with efficient mechanical agitation during four hours:

*Parts by weight of water added to 146.4 amino product*

| | |
|---|---|
| 100 | 225 |
| 125 | 250 |
| 150 | 275 |
| 175 | 300 |
| 200 | |

The aqueous mixtures thus obtained were individually chilled for 2.0 hours at 0° F., with the following results:

| Parts of water | Condition after chilling |
|---|---|
| 0 | Homogeneous, with no separation. |
| 100 | Do. |
| 125 | Do. |
| 150 | Do. |
| 175 | Do. |
| 200 | Do. |
| 225 | Do. |
| 250 | Do. |
| 275 | Do. |
| 300 | Homogeneous immediately after the chilling test, but had developed separation 72 hours later. |

With the progressive further addition of distilled water, it was found, when 400 parts of water had been added to 146.4 parts of the composite aniline product that separation began to develop during the 2.0 hour chilling test.

For the second water compatibility study, the following amounts of distilled water were respectively added to 171.6 parts by weight of "Urea-aniline product #2," in each of the ten cases the incorporation of the distilled water having been carried out with mechanical agitation during an interval of four hours.

*Parts by weight of water added to 171.6 parts amino product*

| | |
|---|---|
| 25 | 166.6 |
| 50 | 183.2 |
| 75 | 185 |
| 100 | 191.6 |
| 150 | 200 |

In the above series the first eight aqueous dilution products were homogeneous liquids, which showed no tendency toward separation before or after having been chilled for 2.0 hours at 0° F. But the addition of 191.6 and of 200 parts of water, respectively, gave non-homogeneous products, which developed separation even before having been chilled.

However, these first eight chilled dilution products (25 to 185 parts water, respectively), which were entirely homogeneous at the end of the chilling test and for 48 hours thereafter, were again examined after having stood at room temperature for approximately one month. After this longer interval it was found that only the first four previously chilled dilution products still remained homogeneous liquids, the last four aqueous mixtures having developed separation:

The following observations were made:

| Parts of water | Condition after one month |
|---|---|
| 25 | Homogeneous, with no separation. |
| 50 | Do. |
| 75 | Do. |
| 100 | Do. |
| 150 | Slightly cloudy. |
| 166.6 | Cloudy. |
| 183.2 | Very cloudy. |
| 185 | Do. |

These water compatibility studies show that while many of the components of the composite amino-carboxylic acid products of the invention are mutually soluble, there may be present substantial amounts of one or more dispersed substances, which are insoluble.

The composite nature of these amino-carboxylic acid products therefore, whether they be more soluble in water (hydrophilic) or more soluble in organic liquids (hydrophobic), provides valuable auto-emulsification properties, whereby they advantageously may be widely used in commercial polyphase systems, the polar bodies present becoming adsorbed and oriented at the interfacial boundaries, whether for liquid-gas systems (foaming agents), liquid-liquid systems (emulsions), or liquid-solid systems (suspensions).

Accordingly, three of the distinctive and valuable properties of products of this invention, therefore, are the auto-emulsifiability of these composite amino-carboxylic acid products, and their common compatibility for water and for organic solvents, together with the fact that they provide the combined effect of the polar and nonpolar bodies present.

Thus, products obtained with the use of ammonia or aliphatic amines are usually quite soluble or readily emulsified in aqueous media, whereas products made using aromatic amines are soluble or readily emulsified in oily media.

Various types of amino reagents may be used in producing the composite products. In general, it is advantageous to use one of the cheap, by-product mixtures of amine reagents, both because of considerations of cost and because such mixtures are more efficient than the simple purified amino bodies. For example, such by-products as the mother liquor from the synthesis of urea (containing urea, ammonia, ammonium carbamate and water), reduced drip oil, crude o-toluidine, aniline, and the like, may be used with advantage, although simple amines or ammonia (whether anhydrous or aqueous), or such mixtures of amines as result from catalytic amination of unsaturated hydrocarbons or catalytic reaction of alcohols with ammonia or the like may be used. In general, it is advantageous to use an amino reagent which is soluble in, or readily dispersed in, the acid mixture used. For example, with aqueous mixtures, dispersions or solutions of carboxylic acid-containing products, it is advantageous to use water-soluble, phenylene diamines, aliphatic amines, urea-containing products or the like; whereas with high molecular weight acid constituents, or constituents dissolved or dispersed in hydrocarbon or other organic media, e. g., crude naphthenic acids or tall oil or the crude undecylenic acid mixtures from the pyrolysis of castor oil, it is advantageous to use aromatic amines, such as aniline or reduced drip oil.

For example, I have prepared a homogeneous, mobile liquid cure-activator (for use in rubber compositions in conjunction with stearic acid) simply by the direct treatment of approximately twice the equivalent weight of aniline (with respect to acid number), with a crude mixture containing undecylenic acid (obtained from the cracking of castor oil), the said mixture having approximately an acid number of 146.3 and an iodine number of 112.5.

The resulting product thus obtained was a stable, homogeneous, relatively non-volatile, mobile red oil, suitable for incorporation in solid crude rubber compositions.

A particularly important type of reagent for such purposes as surface-treating finely divided powders, e. g., sulphur or zinc oxide, to increase their dispersibility in water or the like, are reaction products of carboxylic acid-containing mixtures with a mixture of amines which include one or more water-soluble amines as well as one or more oil-soluble amines. A product of this nature is both hydrophilic and hydrophobic. Such a product may be produced, for example, by reacting tall oil with a mixture of aniline and the urea mother liquor by-product which has been referred to above. The aniline reaction product is hydrophobic in nature, relatively insoluble in water, and quite soluble in oils. The urea by-product-carboxylic acid reaction product is quite soluble in water and aqueous media.

These composite amino-carboxylic acid compositions which are both hydrophilic and hydrophobic in nature, because formed through the use of both aliphatic and aromatic amines, have important advantages for use in compounding aqueous dispersions of rubber, such as natural or synthetic latex, whether by direct addition to the latex or other dispersions or indirect addition, as by the use of surface-treated fillers, such as zinc oxide or carbon black pretreated with such an amino-carboxylic acid composition.

Of course, as pointed out above, the best results, whether the products are used in rubber compounds, as surface-treating agents, as foam stabilizers in latex processing, as wetting agents, or for other purposes, are obtained where the carboxylic acid-containing product not only contains the carboxylic acid, but also contains compatible, well dispersed, relatively insoluble (in the added solvent or diluent) non-acid organic substances which tend to decrease the surface tension of, and to increase the colloidal stability of, solutions or suspensions of the amino equilibrium systems of the invention. These additional non-carboxylic acid constituents may be of the nature of hydrocarbons, as in crude naphthenic acids or tall oils, for example, may be ketones or aldehydes or esters or lactones or other oxygenated organic bodies, as in the crude petroleum oxidation products, or may be esters, as in perfumery by-product carboxylic acid-containing products or the like. They may be reactive with amines, as in the case of aldehydes or ketones, potentially reactive with amines as in the case of esters and lactones, or may be completely inert toward amines, as in the case of hydrocarbons; but in any event they perform an important function in improving the dispersing and stabilizing properties of the amino reaction products.

For some purposes, there are important advantages in using amino reaction products of one or more highly refined carboxylic acids instead of using unrefined, cheap, crude by-product mixtures of such acids, and the invention includes certain such uses of amino reaction products of highly refined carboxylic acids. For example, in the production of the "latex foam" products, in which the amino reaction products are used both as foaming agents and as cure-activators, it is frequently important to avoid use of any products having any appreciable odor, and for such purposes, amino products of such materials as refined myristic or sebacic acid may be used with advantage; although even for such uses, it is sometimes advisable to use with the refined products a limited amount of an unrefined composite product such as crude undecylenic acid obtained by cracking castor oil, particularly if a slight odor is unobjectionable, because of the important advantages of the use of a mixed product as distinguished from a relatively pure product.

The invention will be further illustrated by the following specific examples, but it is not limited thereto.

*Example 1.*—To 100 parts of a by-product carboxylic acid mixture containing appreciable amounts of isopropyl esters, which is obtained in the manufacture of perfume, having approximately an acid number of 211 and a saponification number of 225, with the approximate percentage acid composition by weight: C-6 to C-10 acids 5%, lauric acid 20%, myrystic acid 50%, palmitic acid 20% and stearic acid 5%, there were slowly added with continuous stirring 50 parts of a diluted mixed amino reagent obtained as a by-product mother liquor from the catalytic synthesis of urea having approximately the following percentage composition by weight: urea 32.48%, ammonia 16.87%, ammonium carbamate 11.63%, and water 39.02%. The product obtained after cooling was an unctuous white paste with a slight agreeable odor. It dispersed readily in rubber latex.

*Example 2.*—A composite amino reaction product was prepared as follows:

50 parts of mixed oxygenated acids with an approximate acid number of 116, separated from the oxidation reaction mixture of 36–40° Bé. Pennsylvania petroleum distillate, and 50 parts of the oxidation reaction mixture with an approximate acid number of 79 of 45° Bé. Pennsylvania petroleum distillate were mixed, and to the mixture was added 19.6 parts of the same ammoniacal urea liquor as was used in Example 1, with stirring and slow addition of the amino product to the acid mixture. The reaction product obtained was diluted with 20% by weight of 50% aqueous alcohol, with the production of a composite, homogeneous product which is compatible with substantial amounts of water, and which, when highly diluted with water, forms an oil-in-water emulsion.

To the resulting product was added 40% by weight of water with the production of a mobile, homogeneous liquid. 5 to 10% by weight of this liquid was added to carbon black, with efficient stirring. The carbon black so treated formed homogeneous stable suspensions upon the addition of water, irrespective of the quantity of water added. Clay similarly treated readily formed stable suspensions in water, as did zinc oxide and other powders.

*Example 3.*—To 100 parts by weight of a partially refined mixture of Roumanian naphthenic acids having an approximate acid number of 258 were added 50 parts of the diluted urea mother liquor of Example 1 (nearly twice the equivalent weight). With continued stirring, and with the gradual addition of the excess urea liquor, a homogeneous product was obtained.

The resulting product did not have an objectionable odor and did not render rubber stock excessively soft, in contrast with highly refined naphthenic acids from Roumanian petroleums, which are not used or suitable for rubber compounding because of their highly objectionable odor and because of the fact that they are such effective softeners for solid crude rubber as to render uncured rubber compositions too "tacky" to be satisfactorily processed.

*Example 4.*—American process zinc oxide powder was sprayed with 0.5% by weight of a 50% aqueous solution of an amino reaction product obtained by reacting a mixture of distilled acids (having approximately an acid number of 364.6, which acids originally had been separated from an oxidation reaction mixture of 45° Bé. Pennsylvania petroleum distillate having an approximate acid number of 50) with 50 parts by weight of the composite diluted amino reagent of Example 1, the reaction product being miscible with water in all proportions.

*Example 5.* — A homogeneous, composite amino-carboxylic acid product was prepared by treating a blend of crude pine fatty acids with an excess of the urea mother liquor used in Example 1.

Specifically, in preparing this uniform amino reaction product, there was used a blend of pine fatty acids, comprising approximately by weight a mixture of 50% fatty acids, 43% rosin acids (calculated as abietic), and 7% sterols (higher alcohols). This pine acid mixture had approximately an acid number of 155, a saponification number of 170, a rosin acids number of 78, and an iodine number of 160.

In preparing the composite amino product, to the slightly warmed mixed pine acids the urea mother liquor was gradually added with efficient stirring. And it was necessary to add considerable water during the incorporation of the urea reagent in order to secure a homogeneous, stable product.

This homogeneous reaction product had a much milder odor than the original mixture of pine acids, and at ordinary temperatures was in the form of a homogeneous thin paste, which could readily be incorporated in rubber mixes. A satisfactory product was obtained by mixing 23% tall oil, 23% of the urea mother liquor, and 54% of water.

*Example 6.*—100 parts by weight of a distilled American semi-solid tall oil having an approximate iodine number of 145 and an acid number of 179 were reacted with 60 parts of aniline (about twice the equivalent weight). The aniline was gradually added with efficient stirring. The product became less viscous than the tall oil and after stirring for 15 hours at room temperature, was a homogeneous thin red oil, readily incorporated in rubber compositions.

Other effective cure-activators for use in rubber compounding, consisting of amino-carboxylic acid products in kinetic equilibrium, were obtained by reacting 100 parts by weight of a carboxylic acid-containing product resulting from the controlled oxidation in the liquid phase of a refined medium heavy distillate from Pennsylvania petroleum (having approximately an acid number of 29, a saponification number of 95, and an iodine number of 8), with 4.63 parts of morpholine, 6.86 parts of di-n-butyl amine, 12.82 parts of di-2-ethylhexyl amine, 15.16 parts of di-2-ethylhexyl amino ethanol, 5.48 parts of di-ethylene triamine, and 7.77 parts of tri-ethylene tetramine, respectively, with the production of six different composite amino-carboxylic acid products adapted for efficient cure-activation of rubber.

*Example 7.*—To 100 parts by weight of a commercial rubber softener containing an appreciable amount of palmitic acid (sold to the rubber industry under the trade name of Seedine), having approximately an acid number of 154 and a saponification number of 185, were added 27.8 parts of the dilute urea mother liquor of Example 1 and 30.8 parts of aniline, each of the amino reagents being used in approximately the stoichiometrical quantity corresponding to the carboxylic acid present. The urea mother liquor was added to the carboxylic acid-containing mixture first with continuous stirring, and was stirred with the acid mixture for one-half hour before the aniline was gradually added. When about one-third of the aniline had been incorporated, the viscosity of the mixture was substantially reduced, so that it could be stirred rapidly with a mechanical stirrer. Rapid agitation was continued during the addition of the remainder of the aniline and for twelve hours thereafter. A light colored, homogeneous composite product was obtained, having the unctuous consistency of a relatively soft paste. It was readily incorporated into solid crude rubber compositions.

*Example 8.*—To a relatively non-viscous grade of asphalt, supplied for rubber compounding purposes under the trade name "Paraflux," was added an amino reaction product prepared by treating with 15.1 parts of aniline 100 parts by weight of a controlled oxidation reaction mixture of 45° Bé. Pennsylvania petroleum, having approximately an acid number of 45.3, and a saponification number of 105, with efficient stirring for 24 hours, after which 10 parts by weight of crude solvent naphtha were incorporated in the aniline reaction product, before it was stirred into the asphalt.

*Example 9.*—To 100 parts by weight of an oxidation reaction mixture of 45° Bé. Pennsylvania petroleum (having an approximate acid number of 159, and an approximate saponification number of 222) were added with mechanical agitation during a four hour interval 26.4 parts of the above-described aqueous urea mother liquor, and then, with efficient stirring and during a five hour interval, 10.0 parts of pulverized meta phenylene diamine were added. At the end of this time a composite amino-carboxylic acid product was obtained as a homogeneous viscous liquid.

*Example 10.*—As another example of a cure-activator for rubber compounding purposes, especially for use in conjunction with a free carboxylic acid such as stearic acid, there was prepared a composite amino reaction mixture of a naval stores by-product ("Belro resin").

This "Belro resin" is a relatively hard, somewhat brittle solid, having approximately an acid number of 130.9, which is of somewhat limited compatibility with rubber but is soluble in acetone.

To 100 parts by weight of finely powdered "Belro resin" there were added 64.2 parts of water and 35.8 parts of the diluted ammoniacal urea mother liquor described above. This mixture was then gently heated until the "Belro resin" melted, when an apparently homogeneous liquid product was obtained after 5 minutes of hand stirring. This carboxylic acid-amino product was subsequently mechanically agitated for two hours at a slightly elevated temperature.

The product thus obtained, after having cooled to room temperature, was a viscous homogeneous liquid, dark brown in color, which could readily be incorporated in crude rubber compositions. It showed no tendency toward separation after having stood at room temperature for 72 hours, nor after having been chilled for one hour at 0° F.

While the invention has been illustrated by the foregoing examples, it is in no way limited thereto. For example, instead of using tall oil, naphthenic acids or petroleum oxidation acids, other carboxylic acid-containing products, particularly crude products, may be used with advantage. Included among the carboxylic acid products which may be used in forming the amino reaction products are the steel rolling mill fatty acid waste products, cottonseed foots, naval store by-products, wool grease by-products, marine oils such as those from whale blubber, cod-liver, herring body fats, mixtures of organic acids from such materials as palm oil, olive oil, cottonseed oil, soya bean oil, linseed oil, peanut oil, and cocoanut oil, or from the animal fats such as tallow or horse fat, other carboxylic acid-containing products such as crude undecylenic acid from cracking castor oil, ricinoleic acid, crude or refined sebacic acid, crude resin acid, such as abietic acid, the mixed organic acids from the distillation of pine wood, and others. Many of these acid-containing mixtures have, as obtained, strong and disagreeable odors, which render them unfit for ordinary use in rubber compounding, surface activation of powder, etc., and are only usable, if usable at all, after hydrogenation or other expensive treatment. After reaction with a suitable amino reagent, the odor of these products is greatly improved, in some cases to such an extent that its disagreeable nature is entirely suppressed while in other cases the odor is made much more mild, so that crude acid-containing products, heretofore considered unsuitable for rubber compounding or the like are made available for such purposes because of the improved odor. Furthermore, many of these acid-containing mixtures contain large proportions of unsaturated fatty acids or other unsaturated substances, which are ordinarily not suitable for use in rubber compounding, for example, because they cause unsatisfactory resistance to ageing. For example, it has been customary in rubber compounding to specify the use of triple-pressed stearic acid to insure the absence of much oleic acid from the rubber compounds. By reacting the fatty acid or carboxylic acid products with an amino reagent, the necessity of using saturated acids is eliminated, because after reaction with the amino reagent, the unsaturated acids do not cause the unsatisfactory resistance to ageing which they cause when used in the free state. The expense of hydrogenation or other treatment may thus be eliminated, and products otherwise useless used with advantage.

A wide range of amino reagents may be used in producing the products of the invention, including the residual urea-ammonia mother liquor referred to in some of the examples, aniline, whether crude or refined, reduced drip oil, para-phenylenediamine, o-toluidine, ammonia, anhydrous or aqueous, other aliphatic and aromatic amines, including mono-amines and poly-amines, as well as primary, secondary and tertiary amines, mixtures of aliphatic and aromatic amines, mixtures of various primary, secondary and tertiary amines, including guanidine, urea, triethylene-tetramine, ammonium carbamate, ethyl amines, butyl amines, and other amines whether complex or simple, and mixtures of these various amines. As pointed out above, one important feature of the invention is the use of mixed aromatic and aliphatic amines for the production of hydrophilic and hydrophobic products for the surface treating of powders, such as zinc oxide or carbon black.

While it has been pointed out that the amino products have particular advantages in rubber compounding, for the production of "foam rubber" (when odorless products or products with an agreeable odor are necessary), for surface-treating powders (such as sulfur, to secure improved dispersion for use in insecticides), or the like, etc., the invention is not limited thereto, as these inexpensive products, advantageously prepared from crude or by-product materials, have other important industrial applications, e. g., as stabilizers or emulsifying agents for asphalt or oily or oleaginous materials, as textile penetrants or wetting agents, in leather processing, as wetting or foaming agents and a wide number of other uses where their emulsifying or dispersion stabilizing properties are of advantage. The fact that the products may be hydrophilic, or hydrophobic or contain both hydrophilic and hydrophobic constituents, which permits control of their wetting properties and adaptability to various uses, of course, materially contributes to their usefulness.

I claim:

1. As new products, composite, aqueous homogeneous mixtures containing an appreciable amount of at least one free carboxylic acid, at least one free amino reagent, and at least one carboxylic acid-amino neutralization product.

2. Compositions as in the preceding claim, which in addition contains at least one non-acidic organic material dispersed therein.

3. Products as in claim 1, in which the combined carboxylic acid constituent comprises a mixture of carboxylic acids.

4. Products as in claim 1, in which the combined carboxylic acid constituent comprises mixed resin and fatty acids produced as by-products in wood processing.

5. Products as in claim 1, in which the combined carboxylic acid constituent comprises mixed resin and fatty acids of tall oil.

6. Products as in claim 1, in which the combined carboxylic acid constituent comprises mixed synthetic carboxylic acids.

7. Products as in claim 1, containing reaction products of at least one carboxylic acid with a water soluble amine and with a water insoluble amine.

8. Products as in claim 1, in which the combined carboxylic acid constituent comprises a mixture of naphthenic acids.

9. Products as in claim 1, in which the combined carboxylic acid constituent comprises mixed natural carboxylic acids.

10. As new products, composite, homogeneous mixtures resulting from the neutralization of at least one carboxylic acid with at least two different non-homologous amino reagents, said mixture containing an appreciable amount of free carboxylic acid, free amino reagents and a carboxylic acid-amino neutralization product.

11. Compositions as in claim 10 which contain in addition at least one non-acidic organic material dispersed therein.

12. As new products, composite homogeneous mixtures resulting from the neutralization of mixed resin and fatty acids of tall oil with at least two different non-homologous amino reagents, said mixture containing an appreciable amount of the free acids, free amino reagents and a carboxylic acid-amino neutralization product.

13. As new products, composite, homogeneous mixtures resulting from the neutralization of at least one carboxylic acid with at least two different non-homologous amino reagents, one of which is ammonia, said mixture containing an appreciable amount of free carboxylic acid, free amino reagents and a carboxylic acid-amino neutralization product.

14. As new products, composite, homogeneous mixtures resulting from the neutralization of at least one carboxylic acid with ammonia and an aliphatic amine, said mixture containing an appreciable amount of free carboxylic acid, free amine and a carboxylic acid-amino neutralization product.

15. As new products, composite, homogeneous mixtures resulting from the neutralization of at least one carboxylic acid with ammonia and an aromatic amine, said mixture containing an appreciable amount of free carboxylic acid, free amine and a carboxylic acid-amino neutralization product.

16. As new products, composite, homogeneous mixtures resulting from the neutralization of at least one carboxylic acid with an aliphatic amine and an aromatic amine, said mixture containing an appreciable amount of free carboxylic acid, free amine and a carboxylic acid-amino neutralization product.

17. As new products, composite, homogeneous mixtures resulting from the neutralization of at least one carboxylic acid with a urea mother liquor by-product, said mixture containing an appreciable amount of free carboxylic acid, free amines of said mother liquor and a carboxylic acid-amino neutralization product.

EDWARD A. VAN VALKENBURGH.